(12) United States Patent
Ridge et al.

(10) Patent No.: US 11,456,653 B2
(45) Date of Patent: Sep. 27, 2022

(54) HYBRID STEPPER MOTOR UTILIZING AXIAL COILS FOR ADJUSTING THE MAGNETIC FIELD OF THE ROTOR

(71) Applicant: GHSP, Inc., Grand Haven, MI (US)

(72) Inventors: Larry Duane Ridge, Whitehall, MI (US); John Thomas Bagley, Grand Haven, MI (US)

(73) Assignee: GHSP, Inc., Grand Haven, MI (US)

( * ) Notice: Subject to any disclaimer, the term of this patent is extended or adjusted under 35 U.S.C. 154(b) by 440 days.

(21) Appl. No.: 16/367,744

(22) Filed: Mar. 28, 2019

(65) Prior Publication Data

US 2020/0313533 A1    Oct. 1, 2020

(51) Int. Cl.
*H02K 37/04*    (2006.01)
*H02K 1/24*    (2006.01)

(52) U.S. Cl.
CPC ............. *H02K 37/04* (2013.01); *H02K 1/24* (2013.01)

(58) Field of Classification Search
CPC ...... H02K 37/04; H02K 1/24; H02K 2213/09; H02K 37/08; H02K 1/246
See application file for complete search history.

(56) References Cited

U.S. PATENT DOCUMENTS

| | | | | |
|---|---|---|---|---|
| 2,704,343 A * | 3/1955 | Streuber | ................ | H02K 21/14 310/112 |
| 3,354,368 A * | 11/1967 | Williamson | ......... | H02H 7/0805 318/721 |
| 3,590,353 A * | 6/1971 | Kobayashi | ............. | H02K 29/12 318/362 |
| 10,851,834 B2 * | 12/2020 | Maki-Ontto | ........ | F16C 32/0463 |
| 2005/0088852 A1 * | 4/2005 | Aguinaga | ............... | B60Q 1/068 362/524 |
| 2006/0284581 A1 * | 12/2006 | Mullin | ...................... | H02P 3/18 318/362 |
| 2008/0001495 A1 * | 1/2008 | Qu | ........................ | H02K 55/02 310/268 |
| 2012/0025636 A1 * | 2/2012 | Roopnarine | ............. | H02K 3/50 310/46 |
| 2013/0027112 A1 * | 1/2013 | Hsu | ........................ | H01F 38/023 336/212 |
| 2014/0145541 A1 * | 5/2014 | Jalebi | ...................... | H02K 17/42 310/198 |
| 2014/0252913 A1 * | 9/2014 | Fahimi | ................... | H02P 25/092 310/216.075 |
| 2015/0171674 A1 * | 6/2015 | Lee | ........................ | H02P 25/22 310/46 |
| 2017/0196204 A1 * | 7/2017 | Willis | ................ | G05D 16/2013 |
| 2018/0262091 A1 * | 9/2018 | Gieras | ..................... | H02K 1/223 |
| 2020/0076345 A1 * | 3/2020 | Ritchey | ................... | H02K 11/33 |

* cited by examiner

*Primary Examiner* — Muhammad S Islam
*Assistant Examiner* — Devon A Joseph
(74) *Attorney, Agent, or Firm* — Price Heneveld LLP

(57) ABSTRACT

A bi-polar hybrid stepper motor includes a stator having a primary winding. The stator and the primary winding are positioned within a housing. A rotor has a magnetic component. The rotor is rotationally operable relative to the stator. An axial coil assembly is positioned within the housing and located proximate ends of the rotor and having a secondary winding. At least a portion of the magnetic component of the rotor is produced by the axial coil assembly in an energized state. The energized state produces an electromagnetic communication between the rotor and the stator.

20 Claims, 10 Drawing Sheets

HYBRID STEPPER MOTOR UTILIZING AXIAL COILS FOR ADJUSTING THE MAGNETIC FIELD OF THE ROTOR

FIELD OF THE INVENTION

The present invention generally relates to electric motors, and more specifically, a hybrid stepper motor that utilizes axial coils that can be energized to modify a magnetic field produced by a rotor during operation of the hybrid stepper motor.

BACKGROUND OF THE INVENTION

Within conventional motors, stepper motors typically include a stator and rotor that cooperate to produce an electromotive force that rotates the rotor relative to the stator. Each of the stator and rotor have a plurality of teeth that electromagnetically cooperate with one another to produce small and incremental rotational changes in a position of the rotor with respect to the stator. Within hybrid stepper motors, the rotor produces an electromagnetic field that cooperates with a separate electromagnetic field that is produced by energized windings that are wrapped around teeth of the stator. These electromagnetic fields of the rotor and stator cooperate to produce the electromotive force that rotates the rotor with respect to the stator. Movement of the rotor is produced by energizing the windings that are wrapped around the teeth of the stator in different sequences that cause the magnetic field of the rotor to rotate in order to align the two magnetic fields so that opposing poles of the rotor and stator are aligned with one another. Continuous rotational movement of the rotor with respect to the stator can be achieved by sequencing the electrical current delivered to the various windings of the stator.

SUMMARY OF THE INVENTION

According to one aspect of the present invention, an electric motor assembly includes a stator having a primary winding. A rotor is rotationally operable relative to the stator. An axial coil assembly is positioned proximate ends of the rotor and having a secondary winding. At least when the secondary winding is energized, the rotor is in electromagnetic communication with the stator. When a primary winding and the secondary winding are energized, the rotor is in electromagnetic communication with the stator via an electromotive force that rotationally operates the rotor relative to the stator.

According to another aspect of the present invention, a bi-polar hybrid stepper motor includes a stator having a primary winding. The stator and the primary winding are positioned within a housing. A rotor has a magnetic component. The rotor is rotationally operable relative to the stator. An axial coil assembly is positioned within the housing and located proximate ends of the rotor and having a secondary winding. At least a portion of the magnetic component of the rotor is produced by the axial coil assembly in an energized state. The energized state produces an electromagnetic communication between the rotor and the stator.

According to another aspect of the present invention, a method for operating a bi-polar hybrid stepper motor includes energizing a winding for a stator. A rotor rotationally operates relative to the stator. A first magnetic component of the rotor is produced via an axial coil assembly. The rotor is operated using a first electromotive force that is produced by the energized winding of the stator and the first magnetic component of the rotor. An electrical current is modified to the axial coil assembly. A second magnetic component of the rotor is operated via the modified electrical current of the axial coil assembly. The first magnetic component is different than the second magnetic component. The rotor is operated using a second electromotive force that is produced by the energized winding of the stator and the second magnetic component of the rotor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
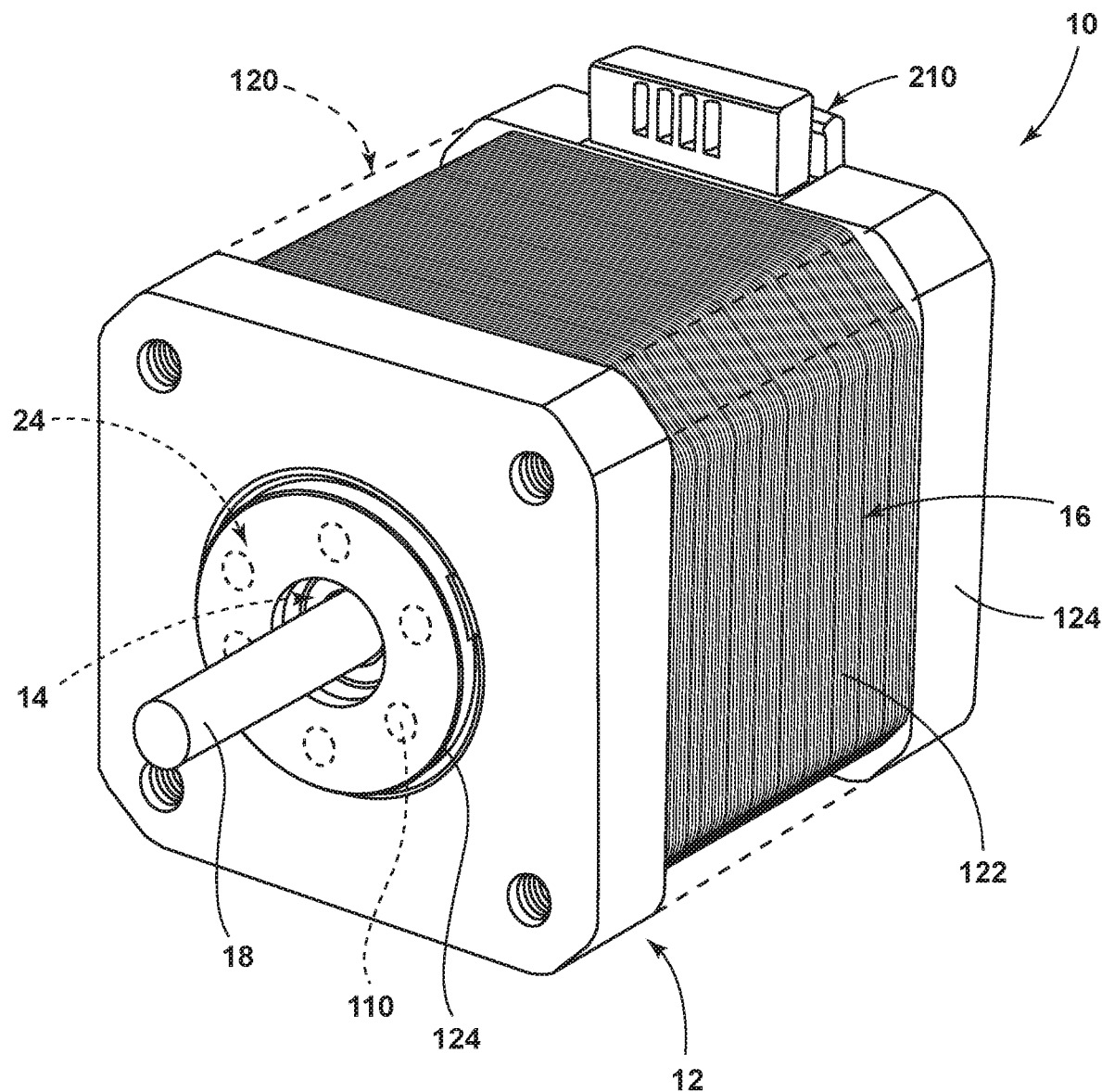
FIG. 1 is a perspective view of a hybrid stepper motor that incorporates an aspect of the axial coils for providing magnetic flux to the rotor for modifying the magnetic field of the rotor.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-9, reference numeral 10 generally refers to an electric motor or an electric motor assembly, and typically a hybrid stepper motor 12 having a rotor 14 that rotationally operates relative to a stator 16 to turn a drive shaft 18 that is coupled to the rotor 14. The drive shaft 18 is then connected to some mechanical component of a device for rotating or otherwise operating a portion of a larger assembly. According to various aspects of the device, the electric motor 10 includes a stator 16 having a set of primary windings 20 that can be energized by application of an electrical current 22 to the primary winding 20. A rotor 14 is also included within the electric motor 10, where the rotor 14 is rotationally operable relative to the stator 16. An axial coil assembly 24 is positioned proximate ends 26 of the rotor 14 and includes a set of secondary windings 28. In various aspects of the device, when the secondary winding 28 is energized via a secondary electrical current 30, the rotor 14 is placed in electromagnetic communication with the stator 16. When the primary winding 20 and the secondary winding 28 are each energized, the rotor 14 is in electromagnetic communication with the stator 16 via an electromotive force 32 that rotationally operates the rotor 14 relative to the stator 16.

Referring again to FIGS. 2-9, during operation of the electric motor 10, electrical current 22 is delivered to the windings of the stator 16. This electrical current 22 is apportioned among the primary windings 20 of the stator to energize, typically, opposing sets of windings at different times. Energizing the primary windings 20 in this fashion modifies the magnetic field 40 that is generated through the electrical current 22 energizing the primary windings 20 according to a preset pattern or sequence. The rotor 14 includes a magnetic component 42 that is configured to interact with the magnetic field 40 generated by the energized primary windings 20. This magnetic component 42 generates a rotor magnetic field 44 that tends to align with the magnetic field 40 generated by the energized primary windings 20 of the stator 16. Accordingly, as different primary windings 20 of the stator 16 are energized, the magnetic component 42 of the rotor 14 causes the rotor 14 to tend to align with the magnetic field 40. As a consequence, the rotor 14 rotates relative to the preset sequence of energized primary windings 20 in the stator 16.

As exemplified in FIGS. 2-9, in order to produce the magnetic component 42 of the rotor 14, the secondary windings 28 of the axial coil assembly 24 are energized through a secondary electrical current 30 that is delivered to the axial coil assembly 24. Upon energizing of the axial coil assembly 24, the axial coil assembly 24 produces a coil magnetic field 50 that provides a magnetic flux 52 through the ends 26 of the rotor 14. This magnetic flux 52, in turn, generates the magnetic component 42 of the rotor 14 and produces the rotor magnetic field 44 that interacts with the magnetic field 40 produced by the energized primary windings 20. The secondary electrical current 30 delivered to the secondary windings 28 of the axial coil assembly 24 can vary. In this manner, the coil magnetic field 50 that is generated by the energized axial coil assembly 24 can also be varied to direct different magnitudes of magnetic flux 52 into the ends 26 of the rotor 14. The variation in the magnetic flux 52 delivered to the rotor 14 may vary, the magnitude of the magnetic component 42 for the rotor 14 that produces the rotor magnetic field 44. Stated another way, increasing and decreasing the secondary electrical current 30 delivered to the axial coil assembly 24 can modulate or otherwise modify the magnitude of the magnetic component 42 of the rotor 14.

By way of example, and not limitation, certain aspects of the rotor 14 may include magnetic members 60 within a body 62 of the rotor 14. These magnetic members 60 are typically small in size and/or may have a small rotor magnetic field 44. Accordingly, the magnetic members 60 that may be disposed within the rotor 14 are sized to provide only a fractional amount (such as approximately one third) of the total potential magnetic component 42 that may be provided by the rotor 14 when the axial coil assembly 24 is energized through the secondary electrical current 30. When no secondary electrical current 30 is provided to the axial coil assembly 24, and the magnetic component 42 consists only of the magnetic members 60, the rotor magnetic field 44 produced by the rotor 14 may be minimal. This minimal rotor magnetic field 44 can magnetically interact with teeth of the stator 16, which are typically made of a ferrous material. The ferrous material can interact with the rotor magnetic field 44 of the rotor 14, even when the primary windings 20 are not energized. Accordingly, when no electrical current 22 is provided to the primary windings 20 and no secondary electrical current 30 is provided to the axial coil assembly 24, rotation of the rotor 14 may result in a minimal detent feel between the magnet members 60 of the rotor 14 and the stator teeth 66 of the stator 16. This minimal detent feel may be perceived by a user of the device, or may be so slight as to be relatively imperceptible by a user.

When the secondary electrical current 30 is delivered to the axial coil assembly 24, the rotor magnetic field 44 of the rotor 14 can be magnified or increased and the detent feel between the rotor teeth 64 and the stator teeth 66 may also be increased. As the secondary electrical current 30 to the axial coil assembly 24 is further increased, the rotor magnetic field 44 may be increased to a point where the rotor 14 is no longer operable within the stator 16. In such a configuration, the rotor magnetic field 44 extending around the rotor 14 is magnetically attracted to the ferrous material of the stator 16 to the point that no rotation is possible and the rotor 14 is rotationally fixed relative to the stator 16.

In various aspects of the device, the magnetic component 42 of the rotor 14 may be provided exclusively by the axial coil assembly 24. In such an embodiment, no magnetic members 60 are positioned within the body 62 of the rotor 14, and the magnetic component 42 of the rotor 14 is provided only through the secondary electrical current 30 being provided to the axial coil assembly 24. In this aspect of the device, when the axial coil assembly 24 is de-energized and no secondary electrical current 30 is provided thereto. Accordingly, the rotor 14 does not include a rotor magnetic field 44 and may rotate freely within the stator 16. In this manner, no magnetic interaction may be perceived between the rotor 14 and stator 16. This may be particularly true when the primary coil is also not energized and no electrical current 22 is delivered to the primary winding 20.

Referring again to FIGS. 1-9, the exemplified electric motor 10 is shown as an inner-rotor configuration, where the rotor 14 rotationally operates within a cavity 80 defined within the teeth of the stator 16. It should be understood that the electric motor 10 described herein can also be configured as an outer-rotor configuration, where the rotor 14 is in the form of a ring that rotates about a central stator core.

As exemplified in FIGS. 1-7, the electric motor 10 is typically a bi-polar hybrid stepper motor 12, where the rotor 14 includes a geometry of rotor teeth 64 having a plurality of rotor teeth 64 defined within an outer perimeter 90 of the rotor 14. This geometry of rotor teeth 64 for the rotor 14 can include as few as two rotor teeth 64, but typically 50 teeth. It is also contemplated that the rotor 14 can include as many as 200 or 400 rotor teeth 64 that are defined within the outer perimeter 90 of the rotor 14.

Within conventional hybrid stepper motors, each tooth defined within the outer surface of the rotor includes a dedicated magnet that cooperates with the stator for modifying the position of the rotor with respect to the stator. These conventional hybrid stepper motors include a consistent magnetic field that is produced by the rotor for interacting with the energized windings of the stator. In these conventional hybrid stepper motors, fine tuning of the detent force between the rotor and the stator is difficult and typically results in a loss of maximum torque that can be provided by the rotor.

As exemplified in the various aspects of the device, as shown in FIGS. 1-9, the rotor 14 may include magnetic members 60 within each rotor tooth 64 defined within the outer perimeter 90 of the rotor 14. As discussed above, these magnet members 60 are typically smaller in size or produce a smaller rotor magnetic field 44 than those rotor magnets contained within conventional motors. While the magnet members 60 of the rotor 14 produce a smaller rotor magnetic field 44, this loss of magnetic field 40 is accounted for through the addition of the axial coil assembly 24 that can be energized through the application of the secondary electrical current 30. The magnet members 60 included within the rotor 14 may define the minimal torque 198 or minimal detent force that can cooperate with the stator teeth 66 of the stator 16 for rotating the rotor 14. This minimal detent force can define what the user may experience as a light clicking or detent feel. As the secondary electrical current 30 is delivered to the axial coil assembly 24, the rotor magnetic field 44 generated by the rotor 14 can be changed, modified, or otherwise modulated in a fine-tuned process that produces a wide range of magnitudes and configurations of the rotor magnetic field 44 produced by the rotor 14.

Figure 6:
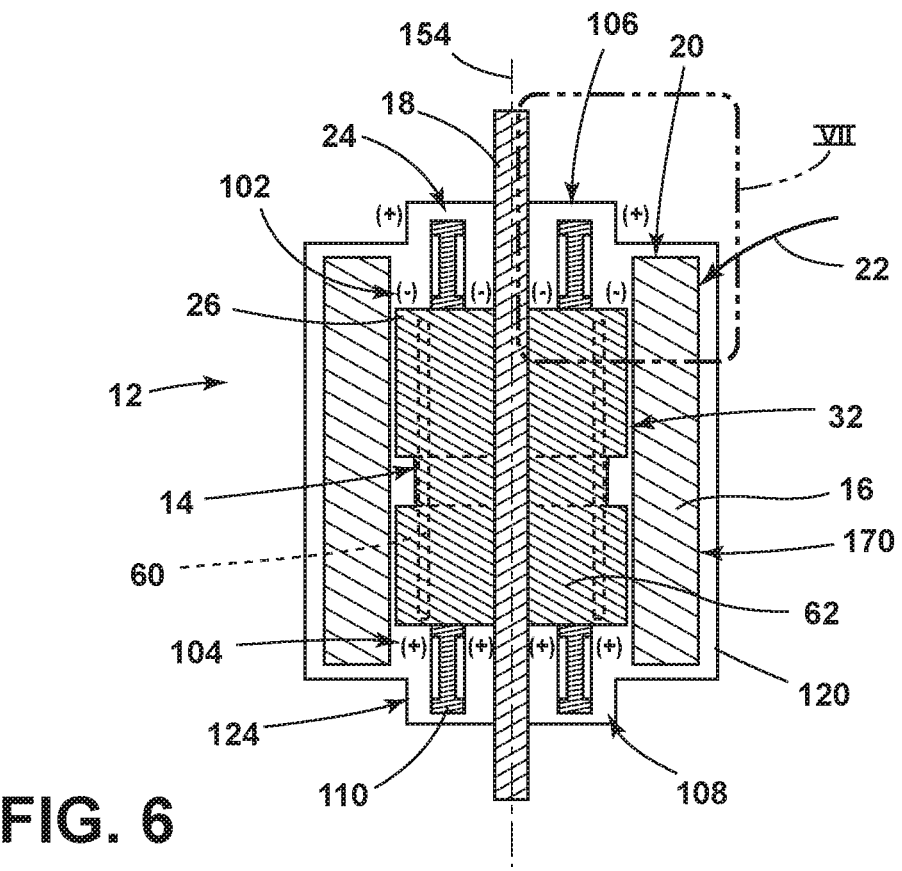
FIG. 6 is a cross-sectional view of the stepper motor of FIG. 1 taken along line VI-VI and showing the axial coils in an energized state.
Figure 7:
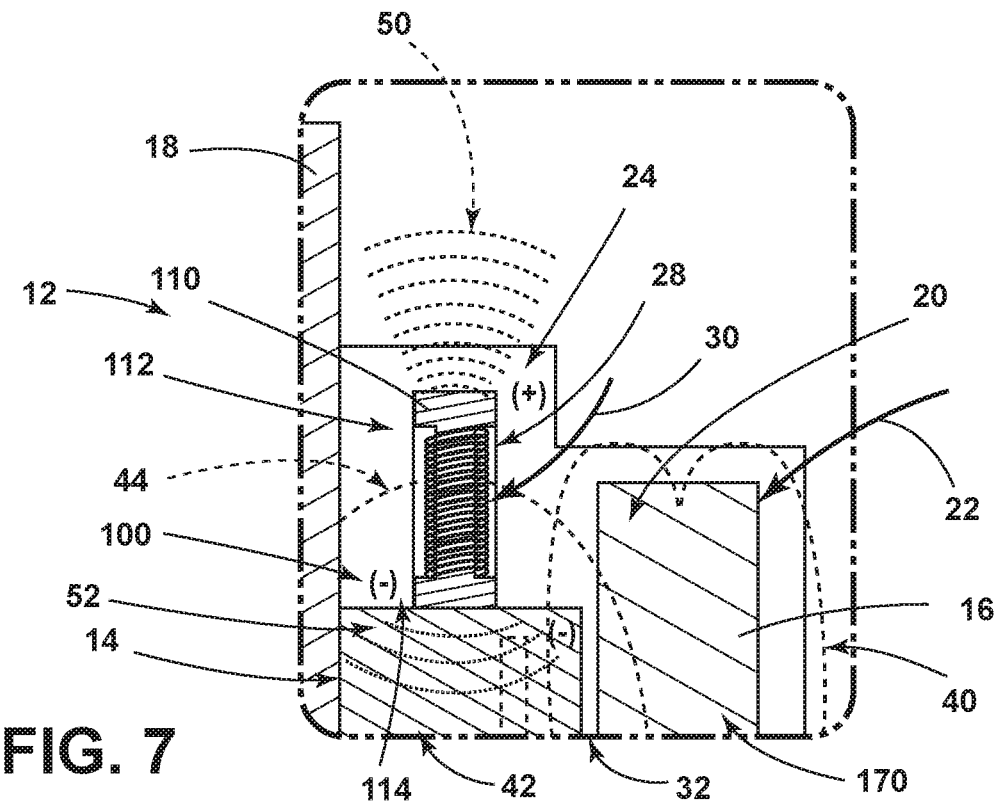
FIG. 7 is an enlarged cross-sectional view of the hybrid stepper motor of FIG. 6 taken at area VII.
Figure 8:
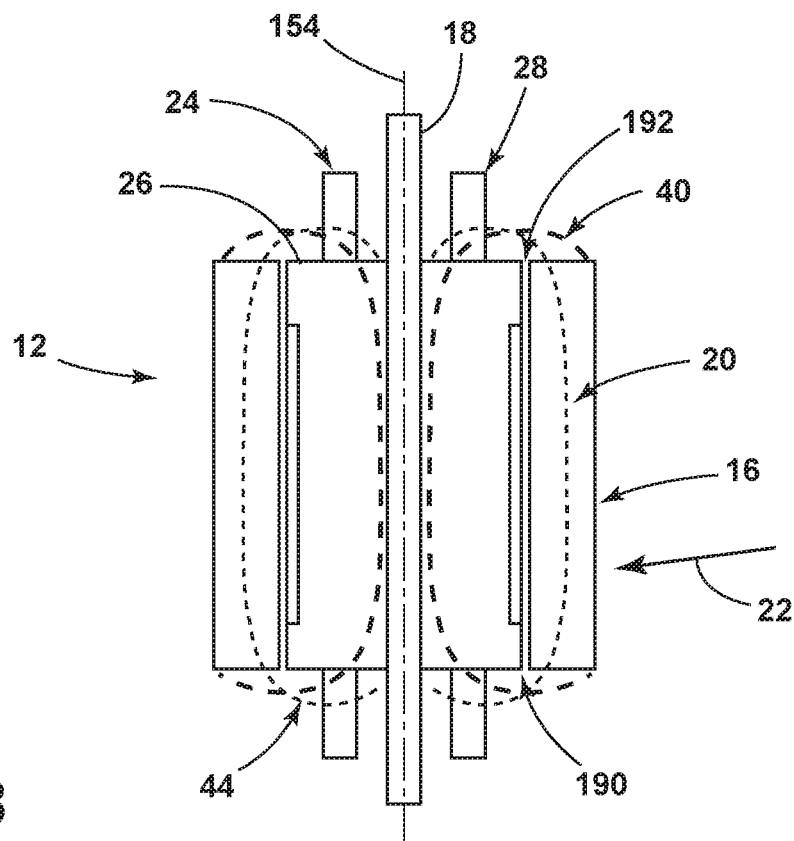
FIG. 8 is a schematic view of an aspect of a hybrid stepper motor with the axial coil assembly not energized.
Figure 9:
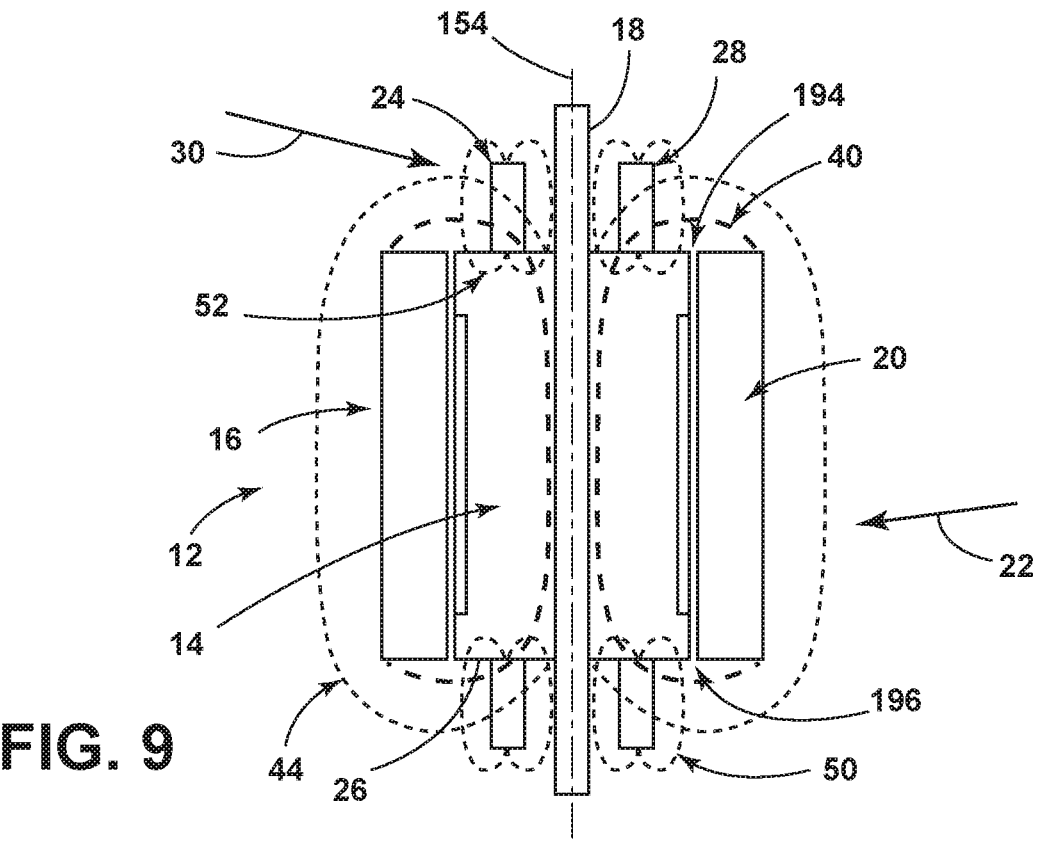
FIG. 9 is the schematic view of the hybrid stepper motor of FIG. 8 with the axial coil assembly energized.
Figure 10:
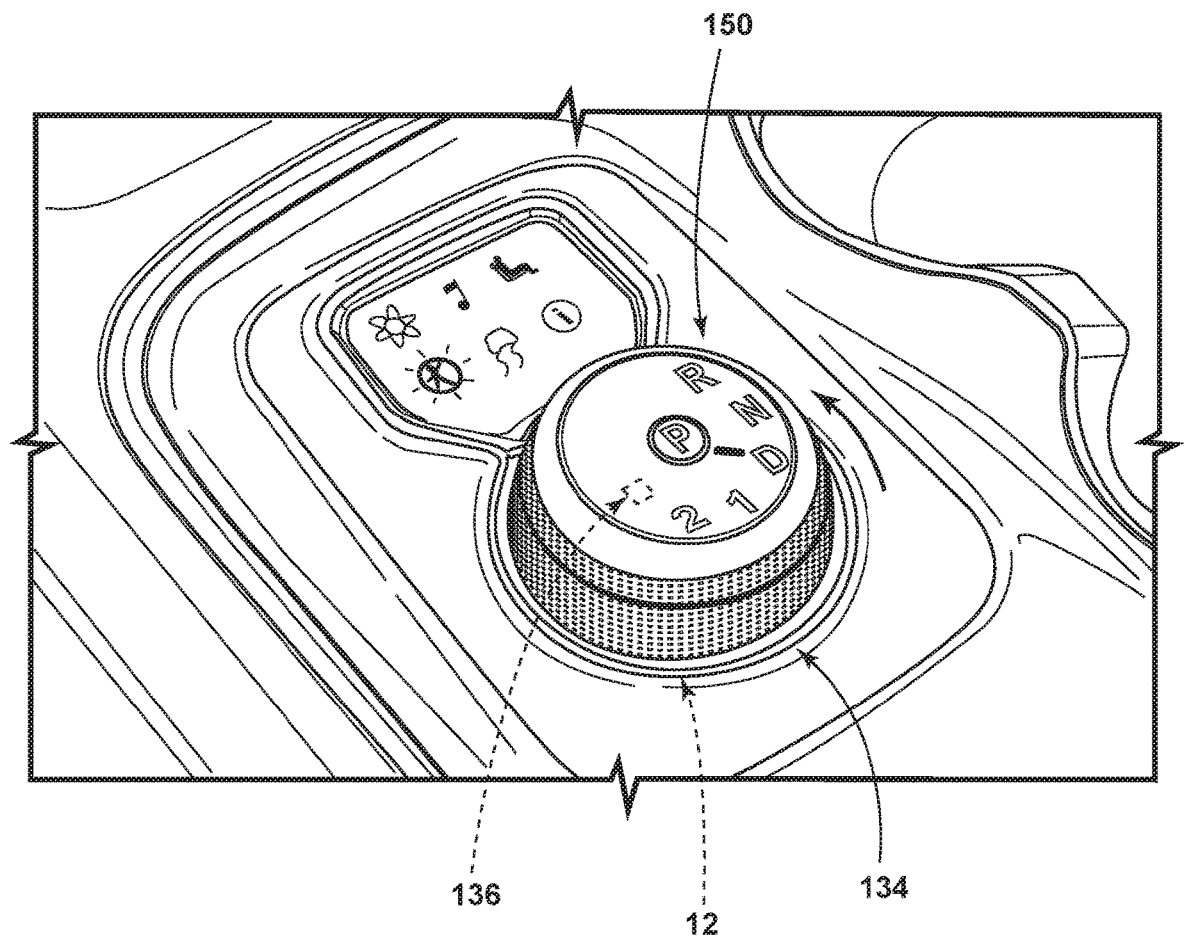
FIG. 10 is a top perspective view of a selector dial for a vehicle that incorporates an aspect of the hybrid stepper motor having the axial coils.
Figure 11:
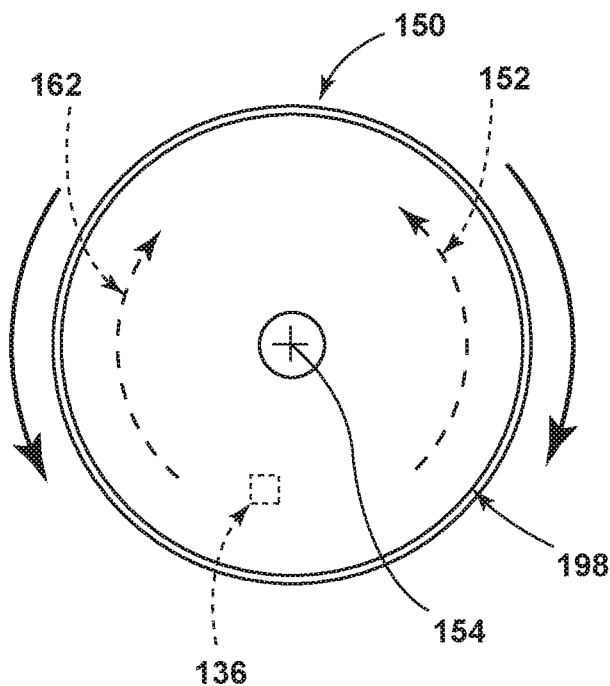
FIG. 11 is a schematic plan view of an aspect of the rotary dial that incorporates the hybrid stepper motor utilizing the axial coils.
Figure 12:
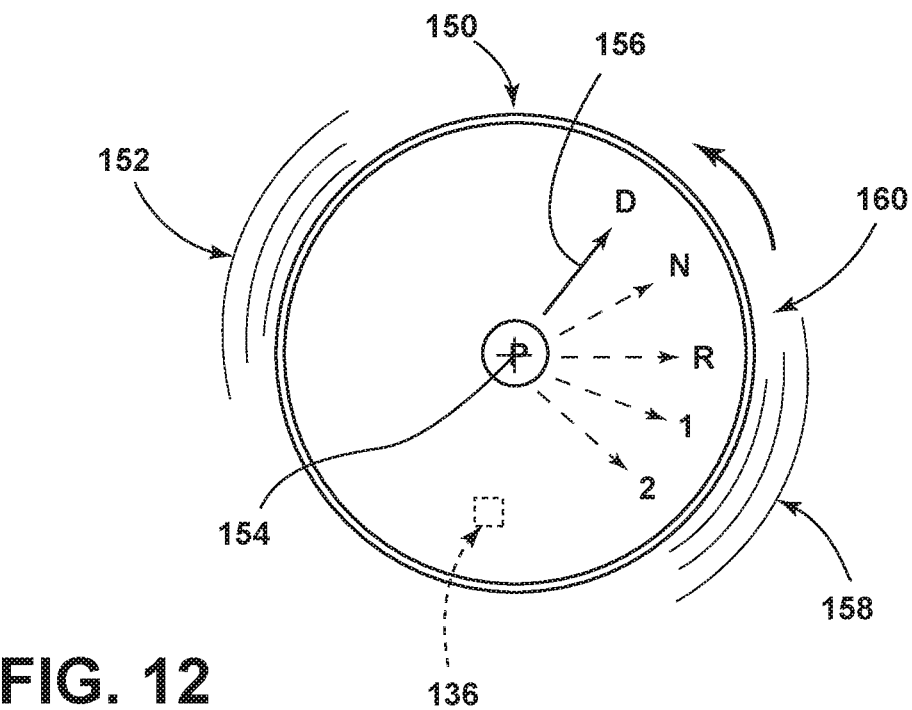
FIG. 12 is a schematic plan view of an aspect of the rotary dial that incorporates the hybrid stepper motor utilizing the axial coils.
Figure 13:
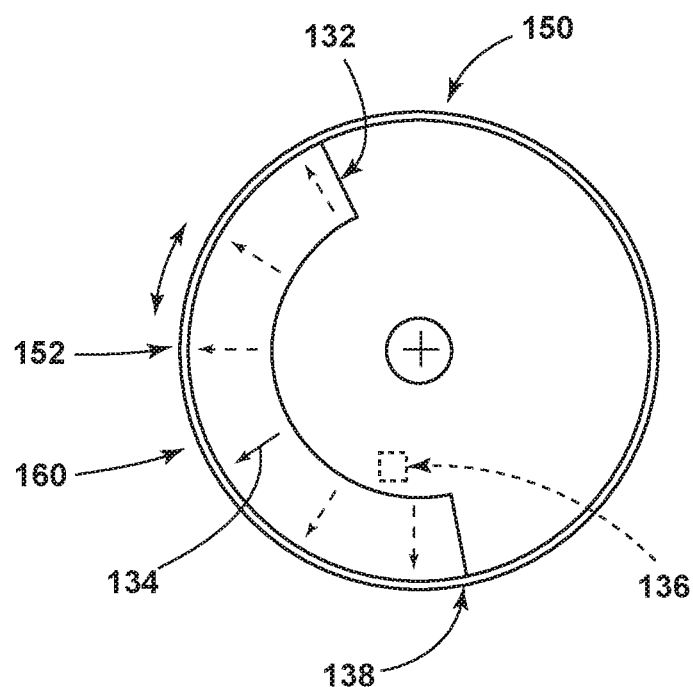
FIG. 13 is a schematic plan view of an aspect of the rotary dial that incorporates the hybrid stepper motor utilizing the axial coils.
Figure 14:
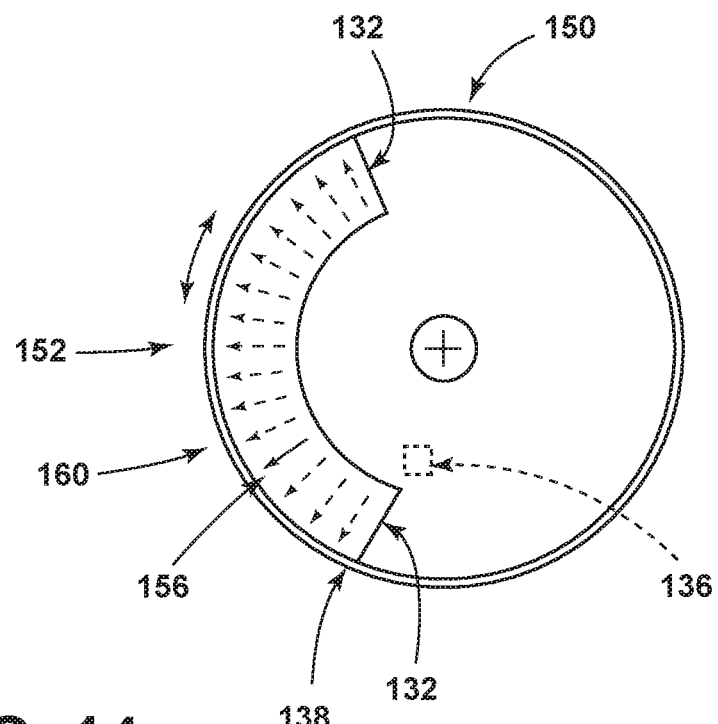
FIG. 14 is a schematic plan view of an aspect of the rotary dial that incorporates the hybrid stepper motor utilizing the axial coils.
Figure 15:
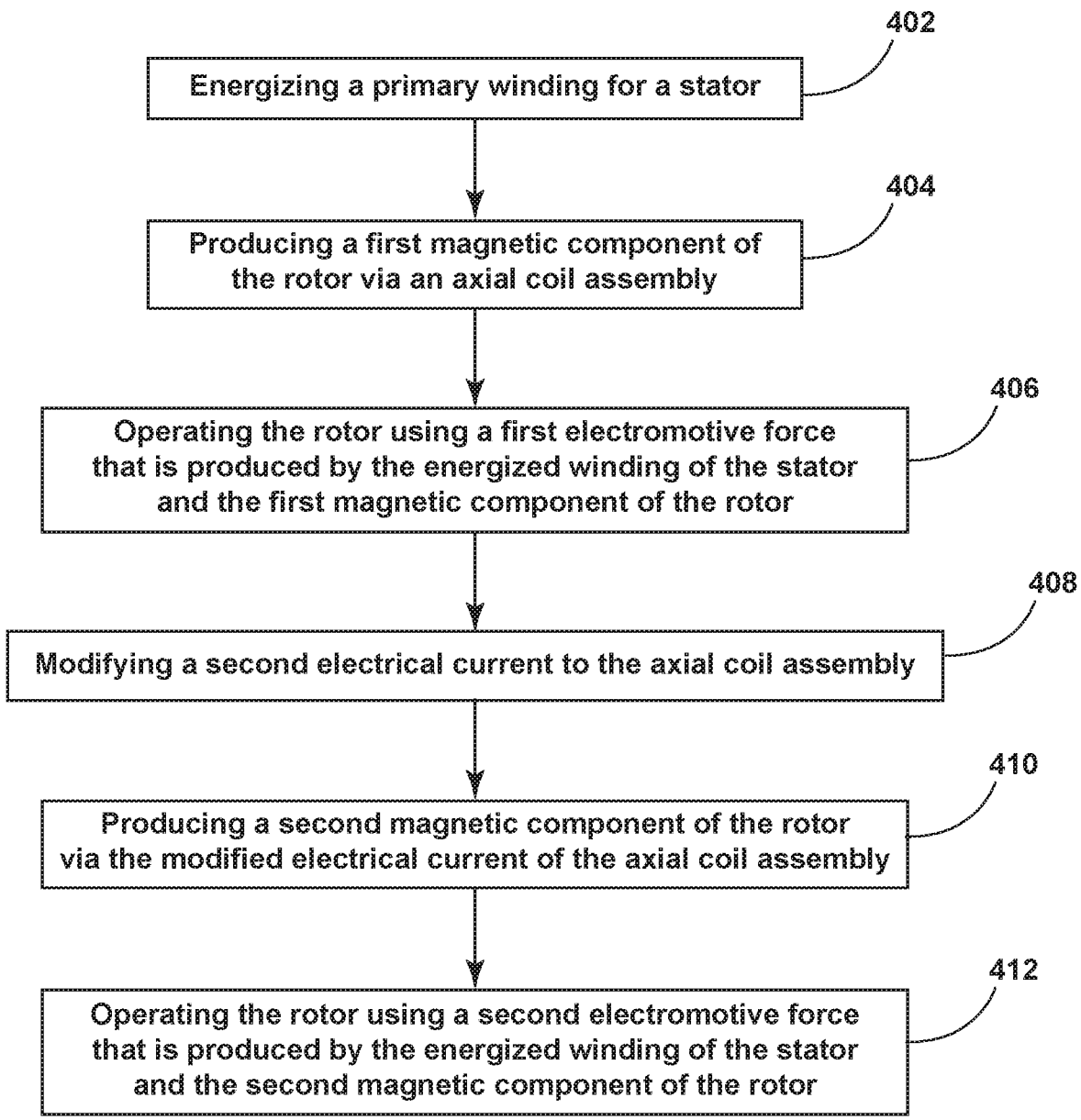
FIG. 15 is a linear flow diagram illustrating a method for operating a hybrid stepper motor utilizing axial coils that deliver magnetic flux to a rotor.

As exemplified in FIGS. 6 and 7, the ends 26 of the rotor 14 of the hybrid stepper motor 12 includes opposing rotor poles 100 that can define a negative pole 102 and a positive pole 104. Each of these rotor poles 100 positioned at the ends 26 of the rotor 14 are located proximate respective first and second sets 106, 108 of posts 110 of the axial coil assembly 24. The secondary windings 28 are wound around these posts 110. When the secondary windings 28 are energized, each of the posts 110 include positive and negative ends 112, 114 that at least partially define the rotor poles 100 for the rotor 14. As shown in FIG. 7, the post 110 of the axial coil assembly 24 includes a positive end 112 that is distal from the rotor 14 and a negative end 114 that is adjacent to or proximate to the rotor 14. When the secondary winding 28 of the axial coil assembly 24 is energized, the magnetic field 40 produced by the post 110 of the axial coil assembly 24 provides magnetic flux 52 into the stator 16. This magnetic flux 52, from the negative end 114 of the secondary winding 28, as shown in FIG. 7, produces the negative pole 102 at the end 26 of the stator 16. At the opposing end 26 of the rotor 14, the opposite is typically true such that the opposing pole of the rotor 14 is positively charged by the positive end 112 of the secondary winding 28 to generate a positive pole 104 of the rotor 14. Accordingly, the positive and negative poles 104, 102 of the rotor 14 are produced through the energized axial coil assembly 24 that produces magnetic flux 52 that is projected into each end 26 of the rotor 14.

In various aspects of the device, where the rotor 14 includes magnetic members 60, the axial coil assembly 24 can magnify the positive and negative poles 104, 102 within the rotor 14 that are consistent with the polarity of the magnet members 60 contained within the rotor 14.

According to various aspects within the device, the magnetic polarity of the magnet members 60 may produce a certain magnitude of the rotor magnetic field 44 that emanates from the rotor 14. It is contemplated that the axial coil assembly 24 can be used in opposition or super imposition with respect to the magnet members 60 to not only add to or magnify the rotor magnetic field 44 produced by the rotor 14 but also diminish the magnitude of the rotor magnetic field 44 produced by the rotor 14. Accordingly, where a magnet member 60 produces a negative pole 102 at an end 26 of the rotor 14, the axial coil assembly 24 may be configured, through the application of the secondary electrical current 30, to place an opposing coil magnetic field 50 at the end 26 of the rotor 14. These opposing magnetic polarities of the magnet members 60 and the secondary windings 28 may at least partially cancel each other out to produce a diminished rotor magnetic field 44 that may have a lesser magnitude than that of the magnetic members 60 alone.

According to various aspects of the device, using the coil magnetic field 50 produced by the axial coil assembly 24, the rotor magnetic field 44 produced by the rotor 14 can be fine-tuned to produce a desired magnitude of the rotor magnetic field 44 that will interact with the magnetic field 40 produced by the primary windings 20 of the stator 16. Through this modification of the rotor magnetic field 44 of the rotor 14, the amount of torque 198 produced by the rotor 14 in relation to the stator 16 can also be varied depending upon the needs of the particular motorized application.

Referring again to FIGS. 2-9, as discussed above, typically the rotor 14 is an inner rotor that rotationally operates within an interior cavity 80 defined by the stator 16 and the primary windings 20. The electrical current 22 delivered to the primary windings 20 is typically an alternating current. It is also contemplated that the secondary winding 28 of the axial coil assembly 24 can be energized through the application of the secondary electrical current 30. Typically, this secondary electrical current 30 will be a direct current.

As exemplified in FIGS. 1-7, the electric motor 10 can be in the form of a bi-polar hybrid stepper motor 12 having a stator 16 that includes the primary winding 20. The stator 16 and the primary winding 20 are typically positioned within a housing 120. The stator 16 can be made of a series of stacked laminations 122, where the stacked laminations 122 are typically made from a ferrous material. The windings are then wound around the poles 170 that are formed by the stacked laminations 122 of the stator 16. This stator 16 can then be overmolded or at least partially surrounded by the housing 120 in the form of an overmold that surrounds the primary windings 20 and the stacked laminations 122 of the stator 16. The rotor 14 of the electric motor 10 includes the magnetic component 42, where the rotor 14 is rotationally operable relative to the stator 16. The axial coil assembly 24 is positioned within the housing 120 and is located proximate ends 26 of the rotor 14. The secondary winding or windings 28 of the axial coil assembly 24 are wound around the posts 110 of the axial coil assembly 24. Typically, the secondary windings 28 and posts 110 of the axial coil assembly 24 are also contained within the housing 120 and may be overmolded along with the remainder of the stator 16. It is also contemplated that the axial coil assembly 24 can be in the form of one or more separate caps 124 that can be coupled with the housing 120 and the remainder of the stator 16 to fix the position of the axial coil assembly 24 relative to the rotor 14. As discussed above, at least a portion of the magnetic component 42 for the rotor 14 is produced by the axial coil assembly 24 when in an energized state through application of the secondary electrical current 30. The energized state of the axial coil assembly 24 at least partially produces an electromagnetic communication between the rotor 14 and the stator 16. This electromagnetic communication, as previously described, can be produced by the application of magnetic flux 52 from the axial coil assembly 24 that is directed into the ends 26 of the rotor 14. This magnetic flux 52 at least partially produces the opposing rotor poles 100 at the ends 26 of the stator 16 that, in turn, produces the rotor magnetic field 44 that can interact with the energized primary windings 20 of the stator 16. As shown in FIGS. 6 and 7, the axial coil assembly 24 includes a first set 106 of posts 110 that are positioned at one end 26 of the rotor 14 and a second set 108 of posts 110 that are positioned at the opposing end 26 of the rotor 14. Typically, the axial coil assembly 24 is rotationally fixed within or relative to the housing 120 such that the rotor 14 rotationally operates relative to the stator 16 and the axial coil assembly 24. In various aspects of the device, it is contemplated that the axial coil assembly 24 may rotate with the rotor 14 to provide the magnetic flux 52 into the rotor 14 as the rotor 14 and the axial coil assembly 24 operate about the rotational axis 154 of the rotor 14. Typically, the axial coil assembly 24 will be rotationally fixed with the stator, in relation to the rotor 14.

As exemplified in FIGS. 2-14, during operation of the hybrid stepper motor 12, the sequencing of the electrical current 22 delivered to the primary windings 20 is typically operated in a sequence that produces the electromotive force 32 that causes a rotation or stops rotation of the rotor 14 with respect to the stator 16. In one exemplary aspect of the device, the axial coil assembly 24 can be utilized to provide an electromotive stopping force 132 that stops rotation of the rotor 14 with respect to the stator at a predetermined rotational position 134. Using a position sensor 136, when the rotor 14 achieves a particular rotational position 134, the axial coil assembly 24 may be energized through the application of the secondary electrical current 30. This secondary electrical current 30 can produce a sufficient magnitude of rotor magnetic field 44, as discussed herein. This rotor magnetic field 44 interacts with the primary magnetic field 40 exerted by the windings of the stator 16 to produce the electromotive stopping force 132 that prevents rotation of the rotor 14 with respect to the stator 16. This electromotive stopping force 132 can be used to define an outer limit 138 of rotation of the rotor 14 with respect to the stator 16.

Referring now to FIGS. 10-14, in an exemplary aspect of the hybrid stepper motor 12 disclosed herein, the windings of the stator 16 and the secondary windings 28 of the axial coil assembly 24 can be cooperatively operated for operating a rotary dial, such as a rotary selector dial 150. Using the primary and secondary windings 20, 28 of the stator 16 and the axial coil assembly 24, respectively, a haptic component 152 can be achieved, where the haptic component 152 can be perceived by the user during operation of the rotary selector dial 150. The haptic component 152 can be in the form of auditory and/or tactile feedback that can be produced by the hybrid stepper motor 12 can be in the form of a drag, where rotation of the rotor 14 with respect to the stator 16 provides a feel of a high-friction interface as the selector dial 150 is operated around a rotational axis 154. The haptic component 152 can also be in the form of one or more detents 156, a vibration component 158, operation within a defined rotational range 160 about the rotational axis 154, application of an opposing electromotive force 162 that opposes operation of the selector dial 150 by a user, and other similar haptic components 152.

As exemplified in FIGS. 2-9, the primary windings 20 of the stator 16 are typically energized by the electrical current 22 in phases. In these phases, only a portion of the primary windings 20 are energized at any particular time. By alternating which of the windings are energized, the electromotive force 32 produced between the magnetic field 40 of the stator 16 and the rotor magnetic field 44 of the rotor 14 produces the electromotive force 32 that rotates the rotor 14 with respect to the stator 16. In various aspects of the device, energizing at least a portion of the axial coil assembly 24 can serve to modify the rotor magnetic field 44 that is produced by the rotor 14. Additionally, by energizing only a portion of the secondary windings 28 of the axial coil assembly 24, the rotor magnetic field 40 produced by the rotor 14 can be increased in certain areas more than others. Accordingly, utilizing the axial coil assembly 24, the sequence of energizing the various secondary windings 28 of the axial coil assembly 24 can produce different rotational effects of the electromotive force 32 that is produced between the stator 16 and the rotor 14. These effects can be in the form of one or more of the haptic components 152 described above. Other effects of activating only a portion of the secondary windings 28 can also result in increased torque 198, increased speed of rotation of the rotor 14, a greater variety of incremental movements of the rotor 14, and other similar rotational effects.

Within the hybrid stepper motor 12, the plurality of rotor teeth 64 that are defined in the outer perimeter 90 of the rotor 14 magnetically interact with the poles 170 of the stator 16. Typically, the poles 170 of the stator 16 will include a plurality of stator teeth 66 that operate to selectively align with the rotor teeth 64 of the rotor 14. By energizing only a portion of the poles 170 or primary windings 20 of the stator 16, and at the same time, activating only a portion of the secondary coils of the axial coil assembly 24, the incremental movements of the rotor 14 can be modified to be larger steps or smaller steps with respect to the stator 16.

In an exemplary aspect, where opposing secondary windings 28 of the axial coil assembly 24 are energized, the rotor magnetic field 44 with respect to the rotor 14 may only be present at opposing sides 180 of the rotor 14. In such an aspect, only a portion of the rotor teeth 64 defined within the outer perimeter 90 of the rotor 14 may be magnetically energized. These magnetically energized rotor teeth 64 can then be drawn to a particular energized pole 170 of the stator 16. This rotational operation between the rotor 14 and the stator 16 may be greater than the distance between the individual rotor teeth 64 of the rotor 14 and the stator teeth 66 of the stator 16. Accordingly, where conventional stepper motors may only able to rotate according to full steps or, in some cases, half steps, energizing a portion of the secondary windings 28 for the axial coil assembly 24 may produce a configuration of the hybrid stepper motor 12 that provides for double steps, quadruple steps or smaller fractional steps within the hybrid stepper motor 12. As the name indicates, a double step configuration can be produced by a tooth of the rotor 14 being attracted to every other tooth of the stator 16.

Similarly, a quadruple step of the rotor 14 may be indicative of a tooth of the rotor 14 being attracted to every fourth tooth of the stator 16. Additional configurations of steps may be produced through the hybrid stepper motor 12 by energizing various combinations of the windings of the stator 16 and the secondary windings 28 of the axial coil assembly 24.

As discussed above, utilizing the windings of the stator 16 and the secondary windings 28 of the axial coil assembly 24, the torque 198, speed, incremental rotation and other factors can be modified through selectively energizing the secondary windings 28 of the axial coil assembly 24.

According to various aspects of the device, the hybrid stepper motor 12 described herein can be utilized within various devices. Such devices can include, but are not limited to, selector dials 150 for vehicles and appliances, robotic applications, disc drives, motorized toys, encoders, and other similar motor applications that require precise positioning, high speeds and variable torque requirements.

Referring now to FIGS. 1-15, having described various aspects of the bi-polar hybrid stepper motor 12, a method 400 is disclosed for operating the bi-polar hybrid stepper motor 12 that incorporates an aspect of the axial coil assembly 24. According to the method 400, a step 402 includes energizing a winding for the stator 16, wherein a rotor 14 for the electric motor 10 is configured to selectively and rotationally operate relative to the stator 16. According to the method 400, step 404 includes producing a first magnetic component 190 of the rotor 14 via an axial coil assembly 24 (illustrated in FIG. 8). As discussed above, the first magnetic component 190 can be produced exclusively by the axial coil assembly 24. In such an embodiment, delivery of the second electrical current 22 to the axial coil assembly 24 serves to energize the secondary windings 28. The secondary windings 28 deliver magnetic flux 52 into the rotor 14 that produces the rotor magnetic field 44 of the rotor 14. It is also contemplated that the first magnetic component 190 of the rotor 14 can be produced exclusively by the magnetic members 60 that are disposed within the rotor 14, typically within the individual rotor teeth 64 defined by the outer perimeter 90 of the rotor 14. In this aspect, the first magnetic component 190 may be defined by the secondary electrical current 30 not being delivered to the axial coil assembly 24. In other words, the first magnetic component 190 may be indicative of the axial coil assembly 24 remaining in an idle state with no secondary electrical current 22, and the first magnetic component 190 being produced exclusively by the magnetic members 60 of the rotor 14. After the first magnetic component 190 is produced, the rotor 14 is operated using a first electromotive force 192 that is produced by energizing the primary windings 20 of the stator 16 (step 406). By energizing the primary windings 20 of the stator 16, the magnetic field 40 produced by the stator 16 interacts with the first magnetic component 190 to produce the first electro-motive force. This first electro-motive force serves to operate the rotor 14, typically in a rotational pattern. The operation of the rotor 14 may be indicative of a stopping force 132 that prevents or slows rotation of the rotor 14 with respect to the stator 16. According to the method 400, step 408 can include modifying the secondary electrical current 30 to the axial coil assembly 24. As discussed above, the secondary electrical current 30 that is provided to the axial coil assembly 24 can serve to modify the magnetic flux 52 delivered to the rotor 14 and also modify the rotor magnetic field 44 that is produced by the rotor 14. Again, modifying the electrical current 22 serves to produce a second magnetic component 194 (illustrated in FIG. 9) of the rotor 14 via the modified electrical current 22 of the axial coil assembly 24 (step 410). Again, where the secondary electrical current 30 is modified, the first magnetic component 190 is typically different than the second magnetic component 194. This variation between the first and second magnetic components 190, 194 typically produces a second electromotive force 196 that results in a modification in the amount of torque 198 that can be produced by the rotor 14 as it operates relative to the stator 16. According to the method 400, step 412 includes operating the rotor 14 using the second electromotive force 196 that is produced by the energized primary winding 20 of the stator 16 and the second magnetic component 194 of the rotor 14 that is produced via the modified secondary electrical current 30 that is delivered to the axial coil assembly 24.

As exemplified in FIGS. 1-15, one or more controllers 210 can be utilized for providing an appropriate electrical current 22 and/or secondary electrical current 30 to the primary windings 20 and secondary windings 28, respectively. Additionally, the one or more controllers 210 can be placed in communication with a position sensor 136 that serves to monitor the rotational position 134 of the rotor 14 with respect to the stator 16. Utilizing the controller 210, the electrical current 22, the secondary electrical current 30 and the positioning sensor can be utilized for operating the hybrid stepper motor 12. In this manner, the controller 210 can be utilized for adjusting the electrical current 22 and the secondary electrical current 30, to produce variances in speed, torque 198, step size, various haptic components 152, and other similar variations that can be produced between the rotor 14 and the stator 16. Additionally, the controller 210 can be placed in communication with the positioning sensor to monitor when changes or modulations in the electrical current 22 and/or secondary electrical current 30 need to be implemented to vary one of the output components of the hybrid stepper motor 12.

According to various aspects of the device, the number of secondary windings 28 that define the axial coil assembly 24 can vary depending upon the particular design of the motor. As exemplified in FIG. 2, eight posts 110 are included, where the secondary windings 28 are wrapped around the various posts 110 of the axial coil assembly 24. It is contemplated that greater or fewer numbers of posts 110 can be included within the axial coil assembly 24. Also, the number of posts 110 that are included within the axial coil assembly 24 may, or may not, match the number of poles 170 included within the stator 16. Typically, the number of posts 110 included within the axial coil assembly 24 will be different than the number of poles 170 of the stator 16. This difference in the configuration of the axial coil assembly 24 and the poles 170 of the stator 16 assists in producing the electromotive force 32 that operates the rotor 14 relative to the stator 16.

Figure 2:
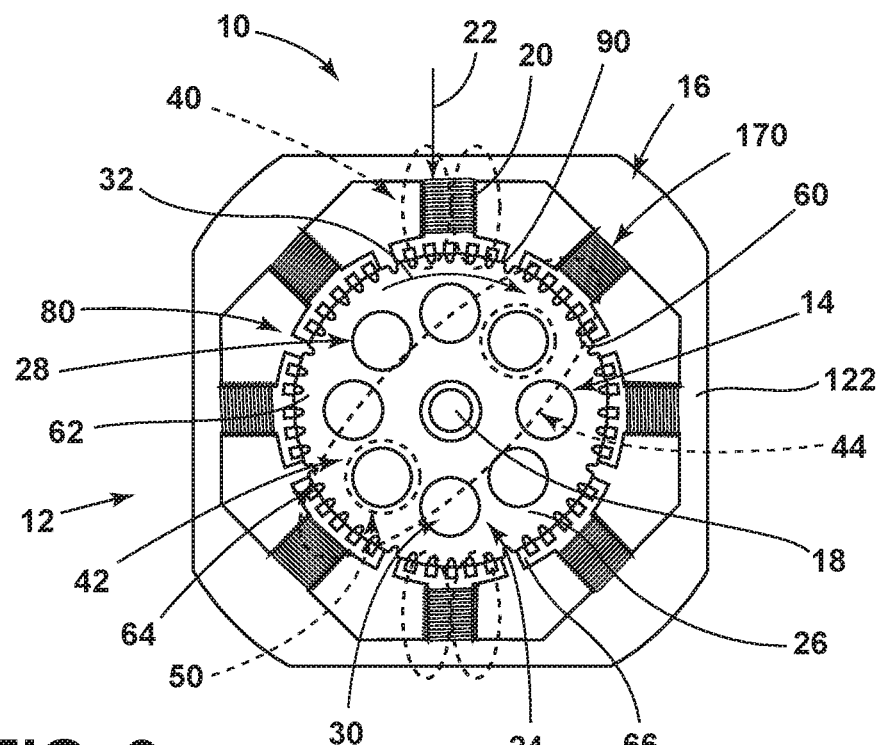
FIG. 2 is a cross-sectional view of the motor of FIG. 1 taken along line II-II.
Figure 3:
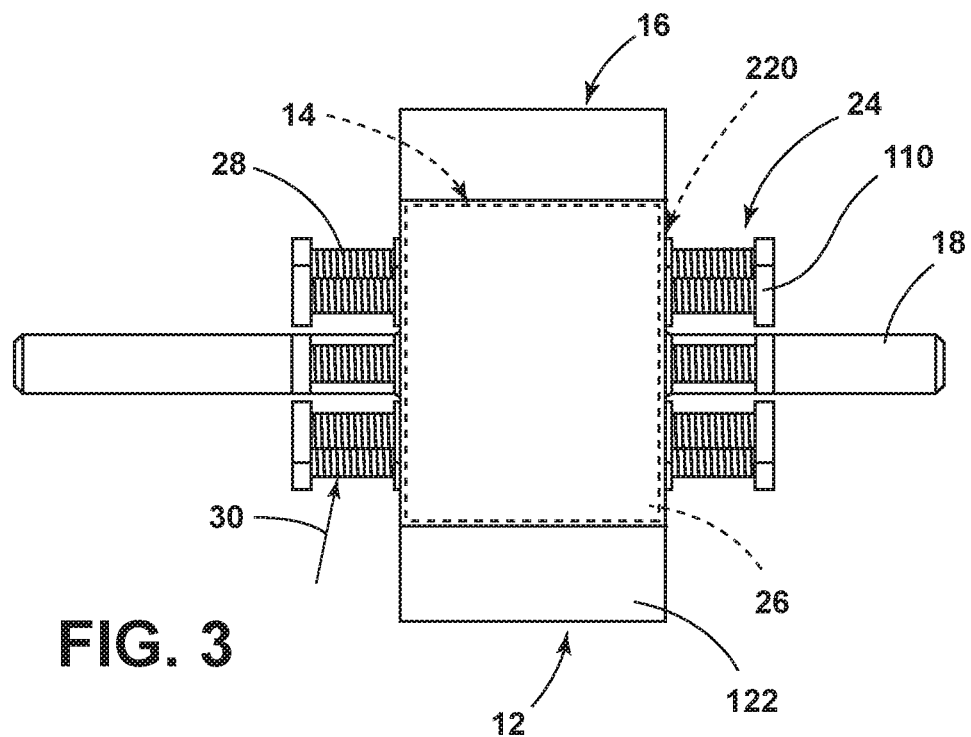
FIG. 3 is a side elevational view of an aspect of a hybrid stepper motor with a housing removed and showing positioning of the axial coils with respect to the stator and rotor.

As exemplified in FIGS. 2-3, the positioning of the posts 110 of the axial coil assembly 24 is typically such that a minimal space 220 exists between the post 110 and the ends 26 of the rotor 14. This close placement serves to maximize the magnetic flux 52 from the axial coil assembly 24 into the rotor 14 that assists in producing the magnetic component 42 of the rotor 14 for operating the electric motor 10.

Figure 4:
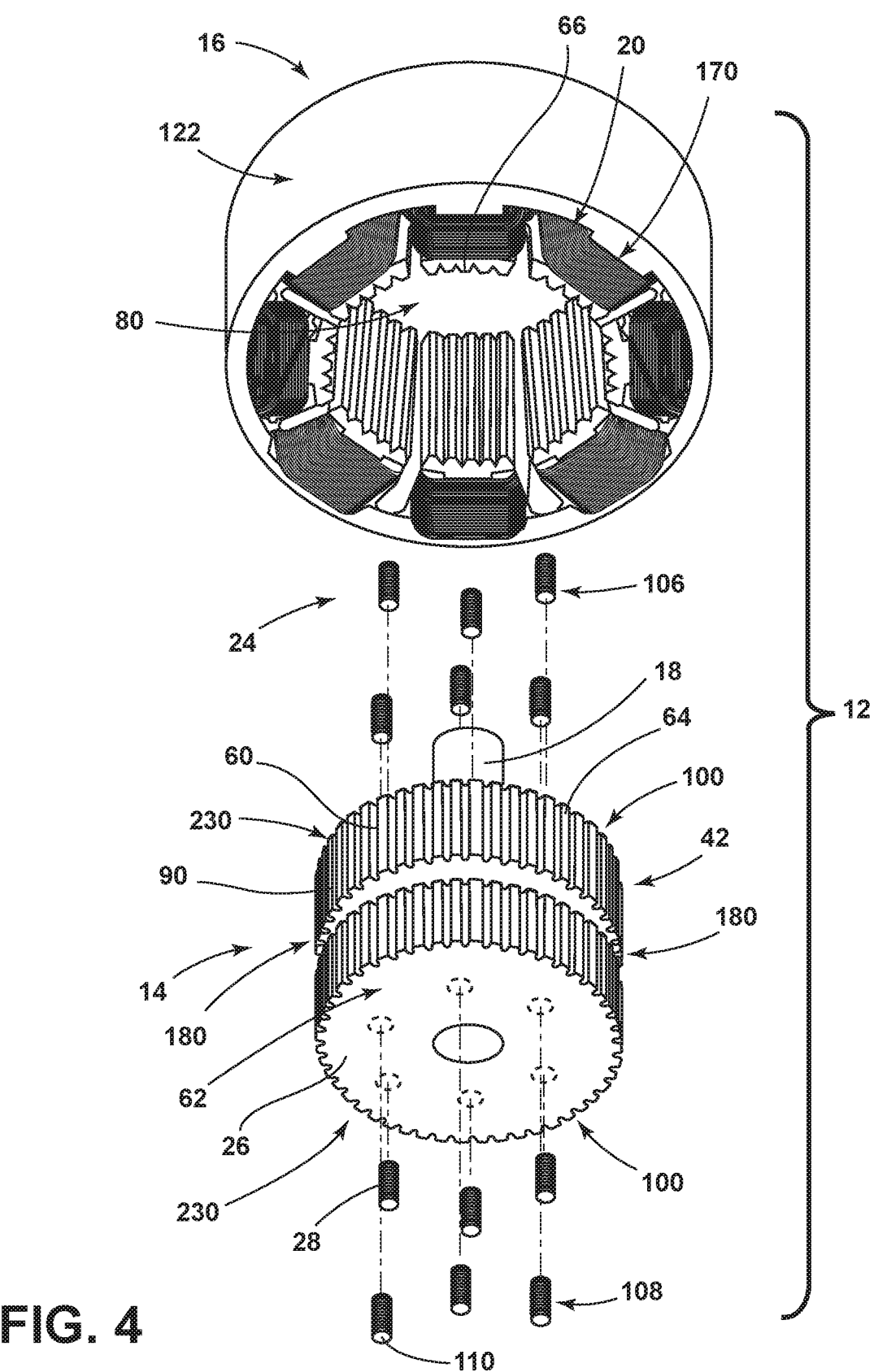
FIG. 4 is an exploded perspective view of an aspect of a hybrid stepper motor that incorporates the axial coils for delivering magnetic flux to the rotor for modifying the magnetic field produced by the rotor.
Figure 5:
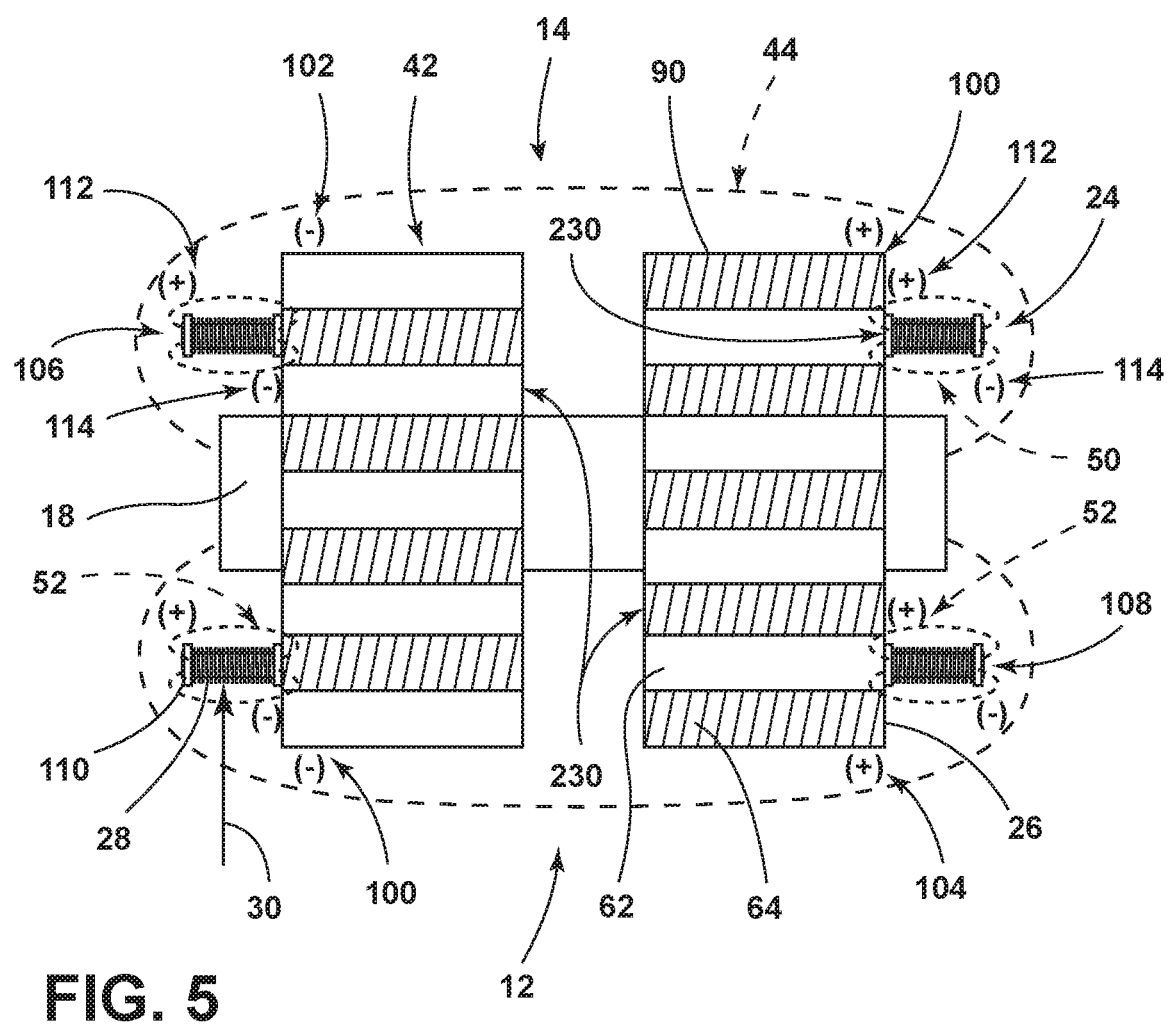
FIG. 5 is a schematic elevational view of a hybrid stepper motor incorporating an aspect of the axial coils.

As exemplified in FIGS. 4 and 5, the configuration of the bi-polar hybrid stepper motor 12 disclosed herein can include separate rotor cups 230 that each define alternating rotor teeth 64 that are defined within the outer perimeter 90 of each of the rotor cups 230. These rotor cups 230 can be separated into opposing ends 26, such that the rotor cup 230 at one end 26 produces a negative pole 102 and the rotor cup 230 at the opposing end 26 produces a positive pole 104 for the rotor 14. According to various aspects of the device, in certain configurations, the use of the axial coil assembly 24 can produce differing effects with respect to the rotor 14. One such effect can be a change in polarity of each of the secondary coils for the axial coil assembly 24. By changing the polarity of each of the secondary windings 28, the polarity of the rotor 14 may also be switched such that the positive and negative poles 104, 102 of the rotor 14 can be alternated back and forth depending upon the direction of the secondary electrical current 30 delivered to the secondary windings 28 of the axial coil assembly 24.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An electric motor assembly comprising:
   a stator having a primary winding that is energized by a primary electrical current;
   a rotor that is rotationally operable relative to the stator, the stator extending around the rotor to define an interior cavity within which the rotor operates; and
   an axial coil assembly positioned proximate ends of the rotor and between a drive shaft of the rotor and an outer edge of the rotor, the axial coil assembly having a secondary winding that is selectively energized by a secondary electrical current, the axial coil assembly being stationary with respect to the stator, wherein:
      at least when the secondary winding is energized, the rotor is in electromagnetic communication with the stator, and
      when the primary winding and the secondary winding are energized, the rotor is in electromagnetic communication with the stator via an electromotive force that rotationally operates the rotor relative to the stator.

2. The electric motor assembly of claim 1, wherein when the stator and the rotor are in an idle state, the rotor rotates substantially freely relative to the stator, wherein the idle state is further characterized by the rotor and the stator being free of magnetic interaction.

3. The electric motor assembly of claim 1, wherein the rotor includes magnetic members that define electromagnetic communication with the stator.

4. The electric motor assembly of claim 3, wherein secondary windings in an energized state directs a magnetic flux into the rotor wherein the magnetic flux increases magnitude of an electromagnetic field that is produced by the rotor.

5. The electric motor assembly of claim 1, wherein the rotor is an inner rotor that rotationally operates within the interior cavity defined by the stator and the primary winding.

6. The electric motor assembly of claim 1, wherein the primary winding is selectively energized by an alternating current.

7. The electric motor assembly of claim 1, wherein the secondary winding is selectively energized by a direct current.

8. The electric motor assembly of claim 1, wherein energizing of the primary and secondary windings defines an electromotive stopping force that selectively secures the rotor in a rotationally fixed position relative to the stator.

9. The electric motor assembly of claim 1, wherein the stator and the rotor define a bi-polar hybrid stepper motor.

10. A bi-polar hybrid stepper motor comprising:
    a stator having a primary winding that is energized by a primary electrical current, wherein the stator and the primary winding are positioned within a housing, wherein the stator defines an interior cavity;
    a rotor having a magnetic component, wherein the rotor is rotationally operable relative to the stator and within the interior cavity; and
    an axial coil assembly positioned in a fixed position within the housing and located proximate opposing end surfaces of the rotor and having a secondary winding, wherein the secondary winding of the axial coil assembly is selectively energized by a secondary electrical current that is separate from the primary electrical current, wherein at least a portion of the magnetic component of the rotor is produced by the axial coil assembly in an energized state, wherein the energized state produces an electromagnetic communication between the rotor and the stator.

11. The bi-polar hybrid stepper motor of claim 10, wherein when the primary winding and the secondary windings are energized, the rotor is in electromagnetic communication with the stator via an electromotive force that selectively operates the rotor relative to the stator.

12. The bi-polar hybrid stepper motor of claim 10, wherein the magnetic component of the rotor is partially defined by magnetic members that are positioned within the rotor.

13. The bi-polar hybrid stepper motor of claim 12, wherein when the axial coil assembly is in an idle state, the magnetic members produce the entire magnetic component of the rotor.

14. The bi-polar hybrid stepper motor of claim 11, wherein the rotor is made of stacked laminations that are made of a ferrous material, and wherein when the axial coil assembly is in an electrically idle state, the rotor and the stator are free of electromagnetic communication.

15. The bi-polar hybrid stepper motor of claim 10, wherein the axial coil assembly includes a first set of posts that are positioned at a first end of the rotor and a second set of posts that are positioned at a second end of the rotor.

16. The bi-polar hybrid stepper motor of claim 10, wherein the secondary windings in the energized state direct a magnetic flux into the rotor, wherein the magnetic flux at least partially defines the magnetic component of the rotor.

17. The bi-polar hybrid stepper motor of claim 10, wherein the rotor is an inner rotor that rotationally operates within the interior cavity defined by the stator and the primary winding.

18. The bi-polar hybrid stepper motor of claim 10, wherein the primary winding is selectively energized by an alternating current, and wherein the secondary winding is selectively energized by a direct current.

19. A method for operating a bi-polar hybrid stepper motor comprising:
    energizing a winding for a stator with a primary electrical current, wherein a rotor rotationally operates relative to the stator;
    producing a first magnetic component of the rotor via an axial coil assembly, wherein the axial coil assembly is energized using a secondary electrical current that is different than the primary electrical current;
    operating the rotor using a first electromotive force that is produced by the energized winding of the stator and the first magnetic component of the rotor;

modifying the secondary electrical current to the axial coil assembly, wherein the axial coil assembly is stationary with respect to the rotor;

producing a second magnetic component of the rotor via the modified secondary electrical current of the axial coil assembly, wherein the first magnetic component is different than the second magnetic component; and operating the rotor using a second electromotive force that is produced by the energized winding of the stator and the second magnetic component of the rotor.

20. The method of claim 19, wherein the first magnetic component is defined by magnetic members of the rotor and the axial coil assembly in an electrically idle state.

\* \* \* \* \*